United States Patent
Zhou et al.

(10) Patent No.: US 12,192,905 B2
(45) Date of Patent: *Jan. 7, 2025

(54) SIMULTANEOUS POWER SAVING BEHAVIOR UPDATE ACROSS MULTIPLE FREQUENCY RESOURCE SETS

(71) Applicant: QUALCOMM Incorporated, San Diego, CA (US)

(72) Inventors: Yan Zhou, San Diego, CA (US); Tao Luo, San Diego, CA (US); Wooseok Nam, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,475

(22) Filed: Sep. 18, 2023

(65) Prior Publication Data

US 2024/0073821 A1    Feb. 29, 2024

Related U.S. Application Data

(63) Continuation of application No. 17/087,282, filed on Nov. 2, 2020, now Pat. No. 11,800,452.

(60) Provisional application No. 62/930,541, filed on Nov. 4, 2019.

(51) Int. Cl.
| | |
|---|---|
| *H04W 52/02* | (2009.01) |
| *H04B 7/0413* | (2017.01) |
| *H04W 72/23* | (2023.01) |
| *H04W 72/0453* | (2023.01) |

(52) U.S. Cl.
CPC ...... *H04W 52/0235* (2013.01); *H04B 7/0413* (2013.01); *H04W 72/23* (2023.01); *H04W 72/0453* (2013.01)

(58) Field of Classification Search
CPC ............. H04W 52/0235; H04W 72/23; H04W 72/0453; H04B 7/0413
See application file for complete search history.

(56) References Cited

U.S. PATENT DOCUMENTS

| | | | |
|---|---|---|---|
| 10,638,431 | B2 | 4/2020 | Yoo et al. |
| 11,800,452 | B2 * | 10/2023 | Zhou ................. H04W 52/0235 |
| 2012/0213137 | A1 | 8/2012 | Jeong et al. |
| 2013/0039239 | A1 | 2/2013 | Lin |
| 2019/0052419 | A1 | 2/2019 | Yang et al. |
| 2019/0174517 | A1 | 6/2019 | Wang et al. |
| 2019/0254110 | A1 | 8/2019 | He et al. |

(Continued)

FOREIGN PATENT DOCUMENTS

| | | |
|---|---|---|
| WO | 2018136691 A2 | 7/2018 |

OTHER PUBLICATIONS

International Preliminary Report on Patentability—PCT/US2020/058676—The International Bureau of WIPO—Geneva, Switzerland—May 19, 2022.

(Continued)

*Primary Examiner* — Brenda H Pham

(57) ABSTRACT

Certain aspects of the present disclosure relate to methods and apparatus for applying a common power saving behavior across multiple sets of frequency resources (e.g., component carriers (CCs) and/or bandwidth parts (BWPs)). A method that may be performed by a user equipment (UE) includes obtaining signaling, from a network entity, indicating a common power saving behavior and applying the common power saving behavior on multiple sets of frequency resources.

30 Claims, 13 Drawing Sheets

(56) References Cited

U.S. PATENT DOCUMENTS

2019/0306739 A1 10/2019 Kim et al.
2021/0136690 A1 5/2021 Zhou et al.

OTHER PUBLICATIONS

International Search Report and Written Opinion—PCT/US2020/058676—ISA/EPO—Feb. 22, 2021.

\* cited by examiner

```
TCI-State ::=              SEQUENCE {
    tci-StateId                TCI-StateId,
    qcl-Type1                  QCL-Info,
    qcl-Type2                  QCL-Info                   OPTIONAL,
    ...
}
Need R
antenna-Ports
OPTIONAL, -- Need R QCL-Info ::=               SEQUENCE {
    cell                       ServCellIndex
Need R
    bwp-Id                     BWP-Id
Comp CSI-RS-Indicated
    referencesignal            CHOICE {
        csi-rs                     NZP-CSI-RS-ResourceId,
        ssb                        SSB-Index,
        csi-RS-for-tracking        NZP-CSI-RS-ResourceSetId
    },
    qcl-Type                   ENUMERATED (typeA, typeB, typeC, typeD),
    ...
}
```

FIG. 7

SIMULTANEOUS POWER SAVING BEHAVIOR UPDATE ACROSS MULTIPLE FREQUENCY RESOURCE SETS

CROSS-REFERENCE TO RELATED APPLICATION(S)

This application is a continuation of U.S. Non-Provisional application Ser. No. 17/087,282, entitled "SIMULTANEOUS POWER SAVING BEHAVIOR UPDATE ACROSS MULTIPLE FREQUENCY RESOURCE SETS", filed Nov. 2, 2020, which claims the benefit of U.S. Provisional Application No. 62/930,541, filed Nov. 4, 2019, which is expressly incorporated by reference herein in its entirety as if fully set forth below and for all applicable purposes.

BACKGROUND

Field of the Disclosure

Aspects of the present disclosure relate to wireless communications, and more particularly, to methods and apparatus for power saving techniques.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include $3^{rd}$ Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are capable of simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

As the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment (UE). The method generally includes obtaining signaling, from a network entity, indicating a common power saving behavior. The method generally includes applying the common power saving behavior on multiple sets of frequency resources.

Certain aspects provide a method for wireless communications by a network entity. The method generally includes providing signaling, to a UE, indicating a common power saving behavior. The method generally includes communicating with the UE on multiple sets of frequency resources in accordance with the common power saving behavior.

Certain aspects provide an apparatus for wireless communication by a UE, comprising a memory and at least one processor coupled to the memory, the at least one processor being configured to obtain signaling, from a network entity, indicating a common power saving behavior and apply the common power saving behavior on multiple sets of frequency resources.

Certain aspects provide an apparatus for wireless communication by a network entity, comprising a memory and at least one processor coupled to the memory, the at least one processor being configured to provide signaling, to a UE, indicating a common power saving behavior and communicate with the UE on multiple sets of frequency resources in accordance with the common power saving behavior.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of transmission configuration indicator (TCI) state information used to signal quasi-colocation (QCL) information, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
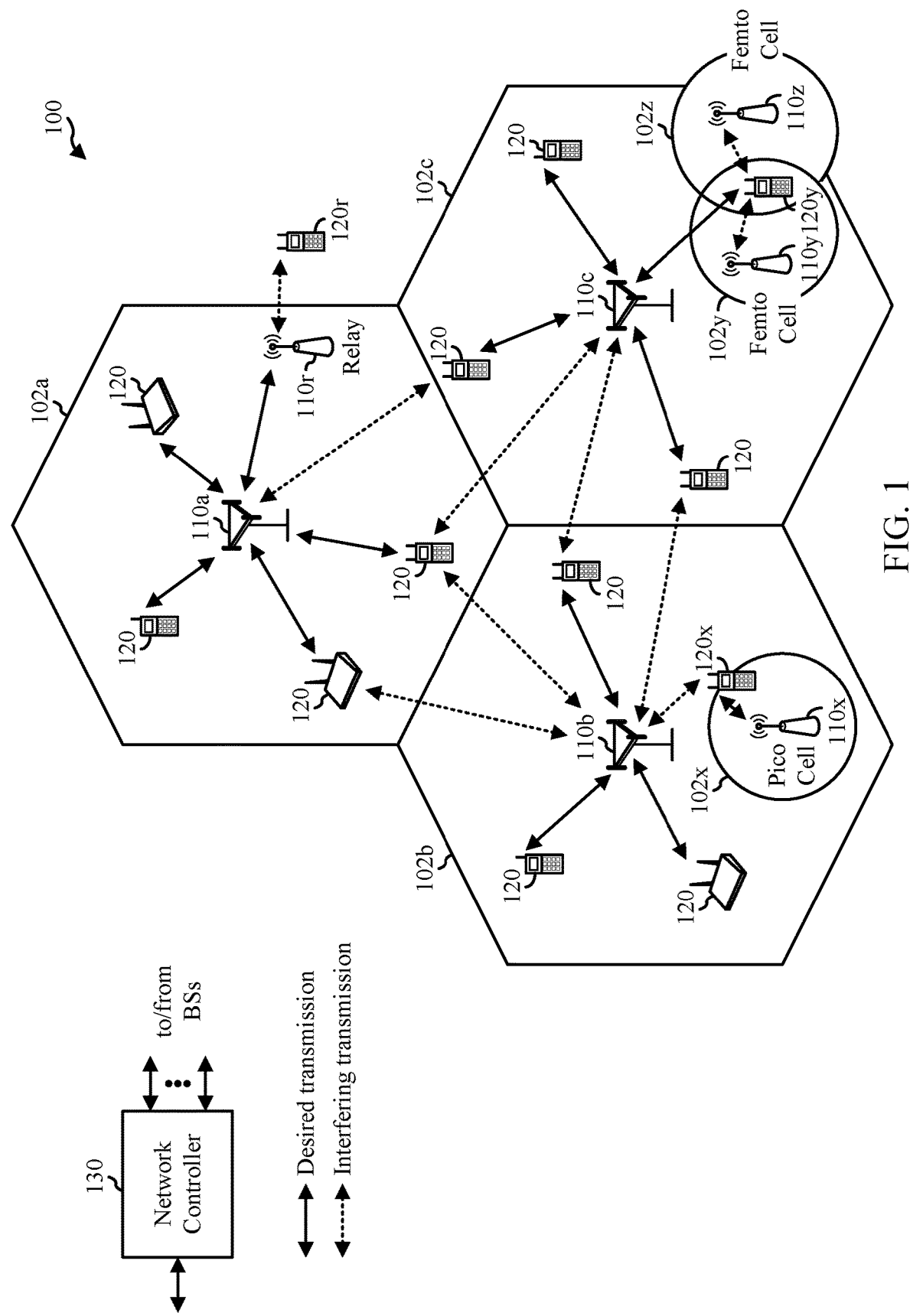
FIG. 1 is a block diagram conceptually illustrating an example telecommunications system, in which aspects of the present disclosure may be performed.

Aspects of the present disclosure provide apparatus, methods, processing systems, and computer readable mediums for new radio (NR) (NR access technology or 5G technology).

NR may support various wireless communication services, such as enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe.

The following description provides examples of simultaneously updating power saving behavior across multiple frequency resource sets, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a new radio (NR) system (e.g., a 5G NR network). As shown in FIG. 1, the wireless communication network 100 may include one or more user equipments (UEs) 120 configured to perform operations 900 of FIG. 9 to simultaneously apply a common power saving behavior across multiple sets of frequency resources (e.g., bandwidth parts (BWPs) or component carriers (CCs)). Similarly, the wireless communication network 100 may include one or more base stations (BSs) 110 (e.g., network entities) configured to perform operations 1000 of FIG. 10 for configuring and communicating with a UE 120 performing operations 900 of FIG. 9.

As illustrated in FIG. 1, the wireless communication network 100 may include a number of BSs 110 and other network entities. A BS may be a station that communicates with UEs. Each BS 110 may provide communication coverage for a particular geographic area. In 3rd Generation Partnership Project (3GPP), the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 50 subframes with a length (period) of 10 ms. Consequently, each subframe may have a length of 0.2 ms. In some cases, subframes may have a length (duration) of 1 ms and each subframe may be further divided into two slots of 0.5 ms each (e.g., with each slot containing 6 or 7 OFDM symbols depending on CP length. A slot may be further divided into mini-slots, each mini-slot having a smaller duration (e.g., containing fewer symbols than a full slot). Each subframe may indicate a link direction (e.g., DL or UL) for data transmission and the link direction for each subframe may be dynamically switched. Each subframe may include DL/UL data as well as DL/UL control information. Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include CUs and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals (SSs)—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
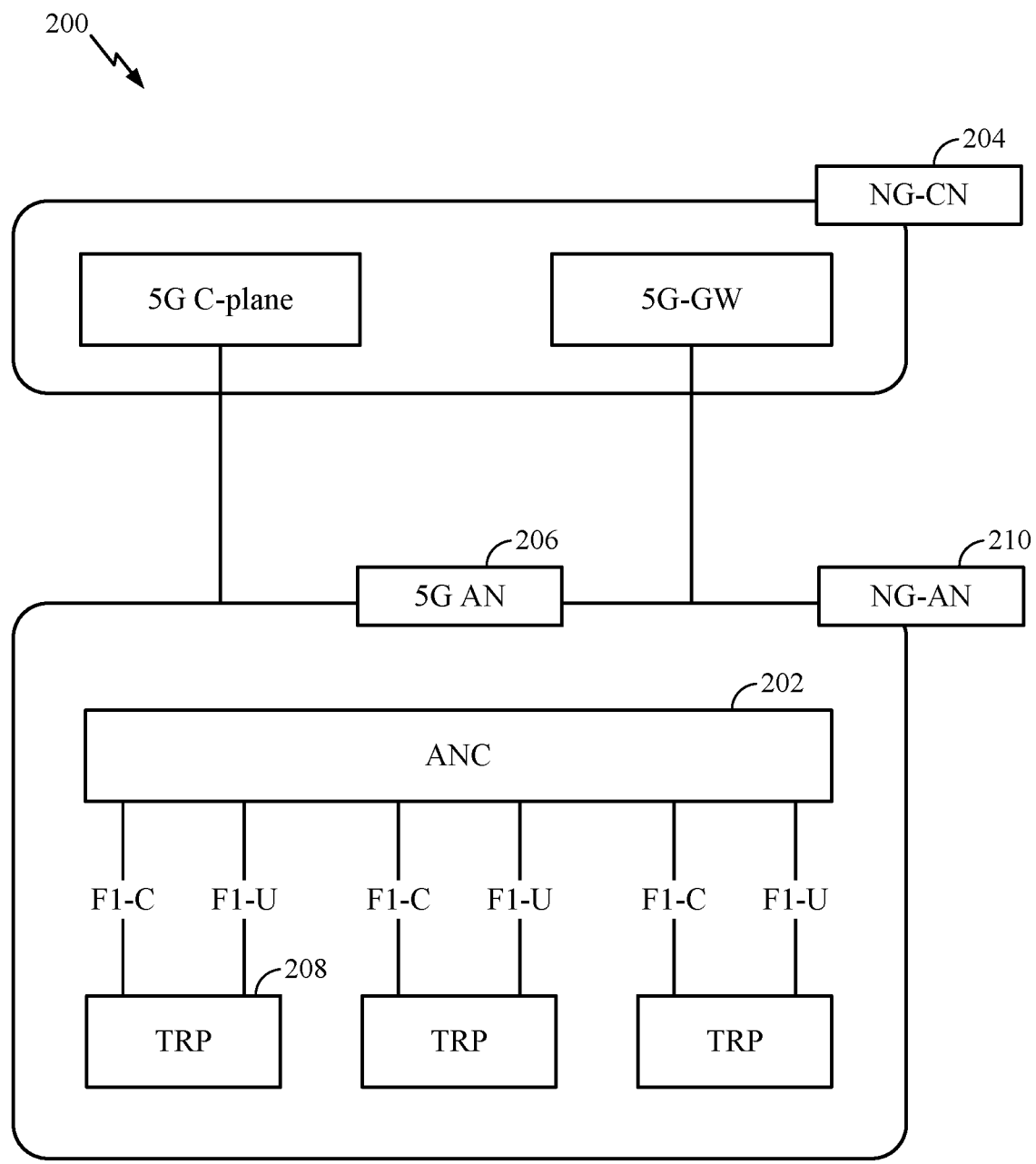
FIG. 2 is a block diagram illustrating an example logical architecture of a distributed radio access network (RAN), in accordance with certain aspects of the present disclosure.

FIG. 2 illustrates an example architecture of a distributed radio access network (RAN) 200, which may be implemented in the wireless communication network illustrated in FIG. 1. A 5G access node 206 may include an access node controller (ANC) 202. The ANC may be a CU of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs 208 may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, the next generation AN (NG-AN) 210 may support dual connectivity with NR and may share a common fronthaul for LTE and NR. The distributed RAN 200 may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
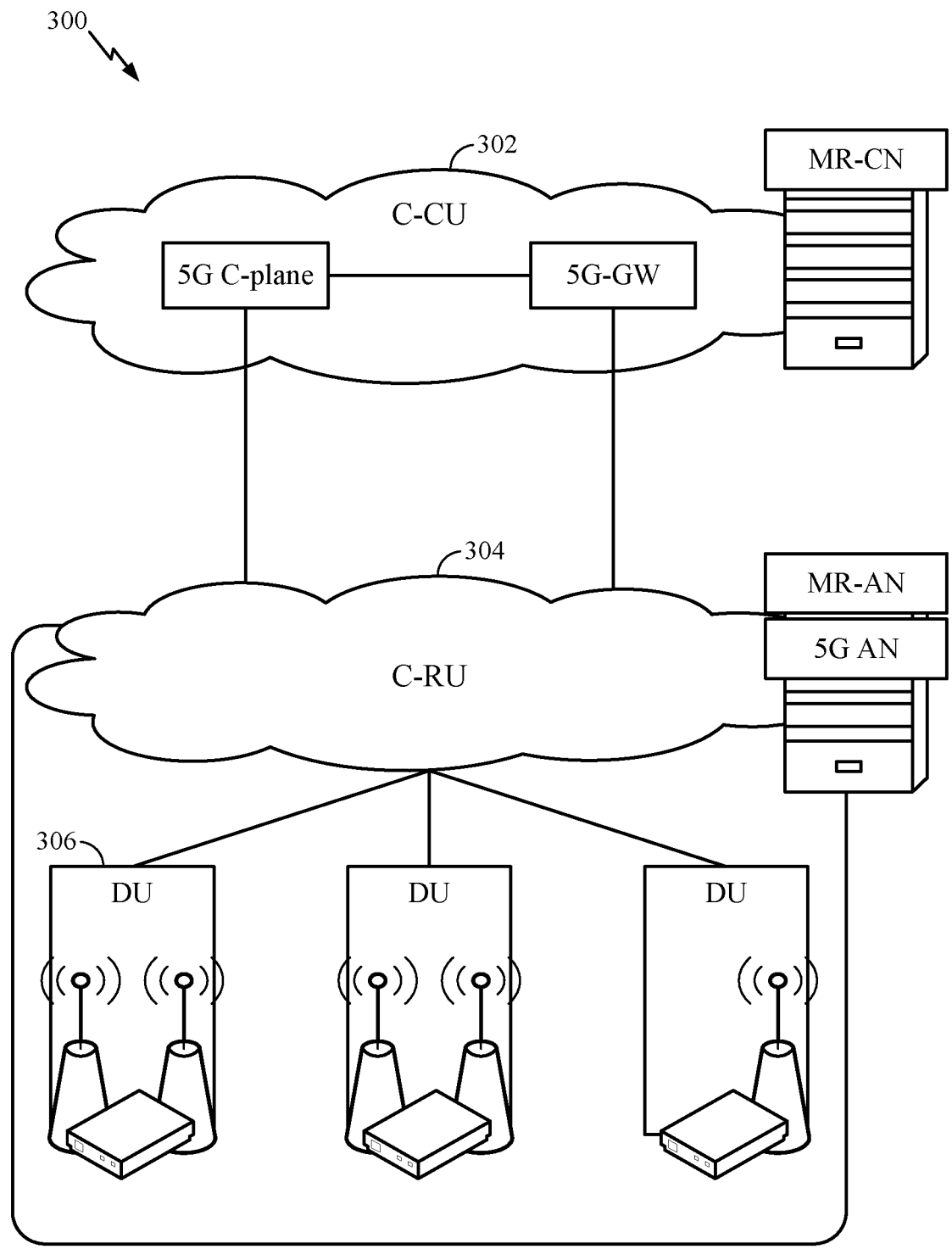
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
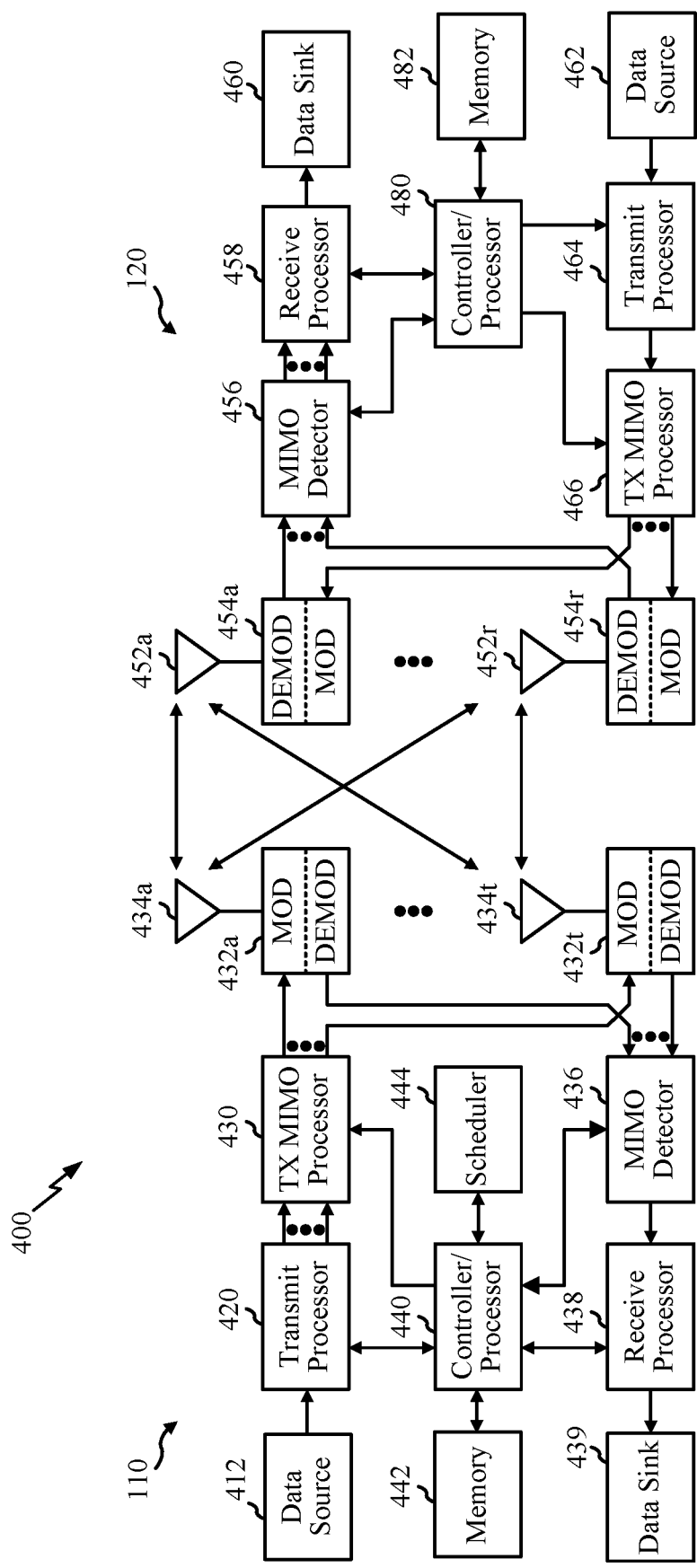
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. As described above, the BS 110 may include a TRP. One or more components of the BS 110 and UE 120 may be used to practice aspects of the present disclosure. For example, antennas 452, processors 466, 458, 464, and/or controller/processor 480 (used to implement transceiver or separate receiver and transmitter chain functions) of the UE 120 may be used to perform operations 900 of FIG. 9 and/or antennas 434, processors 430, 420, 438, and/or controller/processor 440 of the BS 110 may be used to perform operations 1000 of FIG. 10.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), group common PDCCH (GC PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain input symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some TX/RX functionalities, such that they reside in distributed units. For example, some TX/RX processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the processes for the techniques described herein with reference to FIG. 10. The processor 480 and/or other processors and modules at the UE 120 may also perform or direct processes for the techniques described herein with reference to FIG. 9. The memories 442 and 482 may store data and program codes for the BS 110 and the UE 120, respectively. A scheduler 444 may schedule UEs for data transmission on the downlink and/or uplink.

Figure 5:
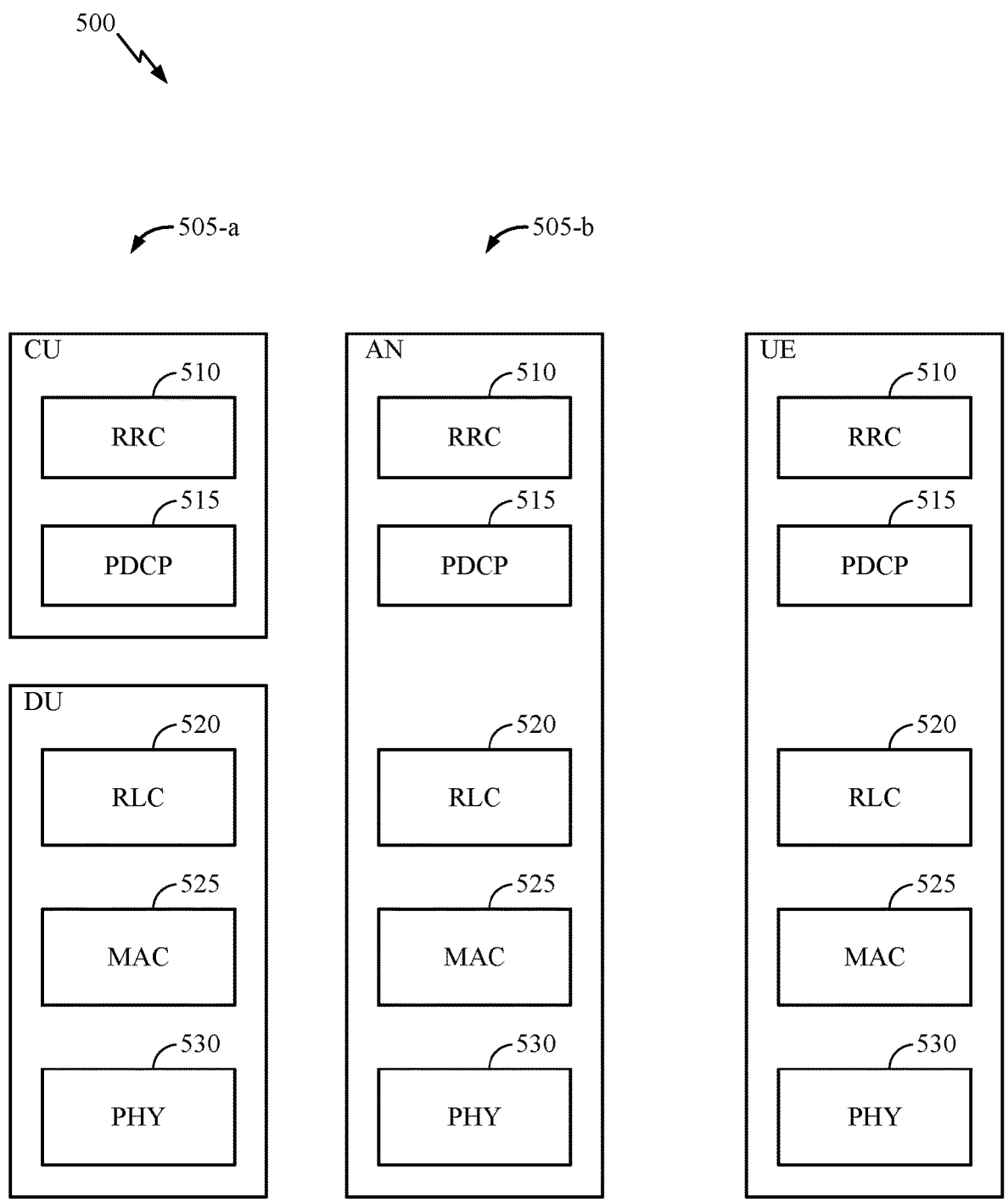
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stack may be implemented by devices operating in a in a wireless communication system, such as a 5G NR system (e.g., the wireless communication network 100) (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the CU, and an RLC layer 520, a MAC layer 525, and a PHY layer 530 may be implemented by the DU. In various examples the CU and the DU may be collocated or 200539C 1 non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
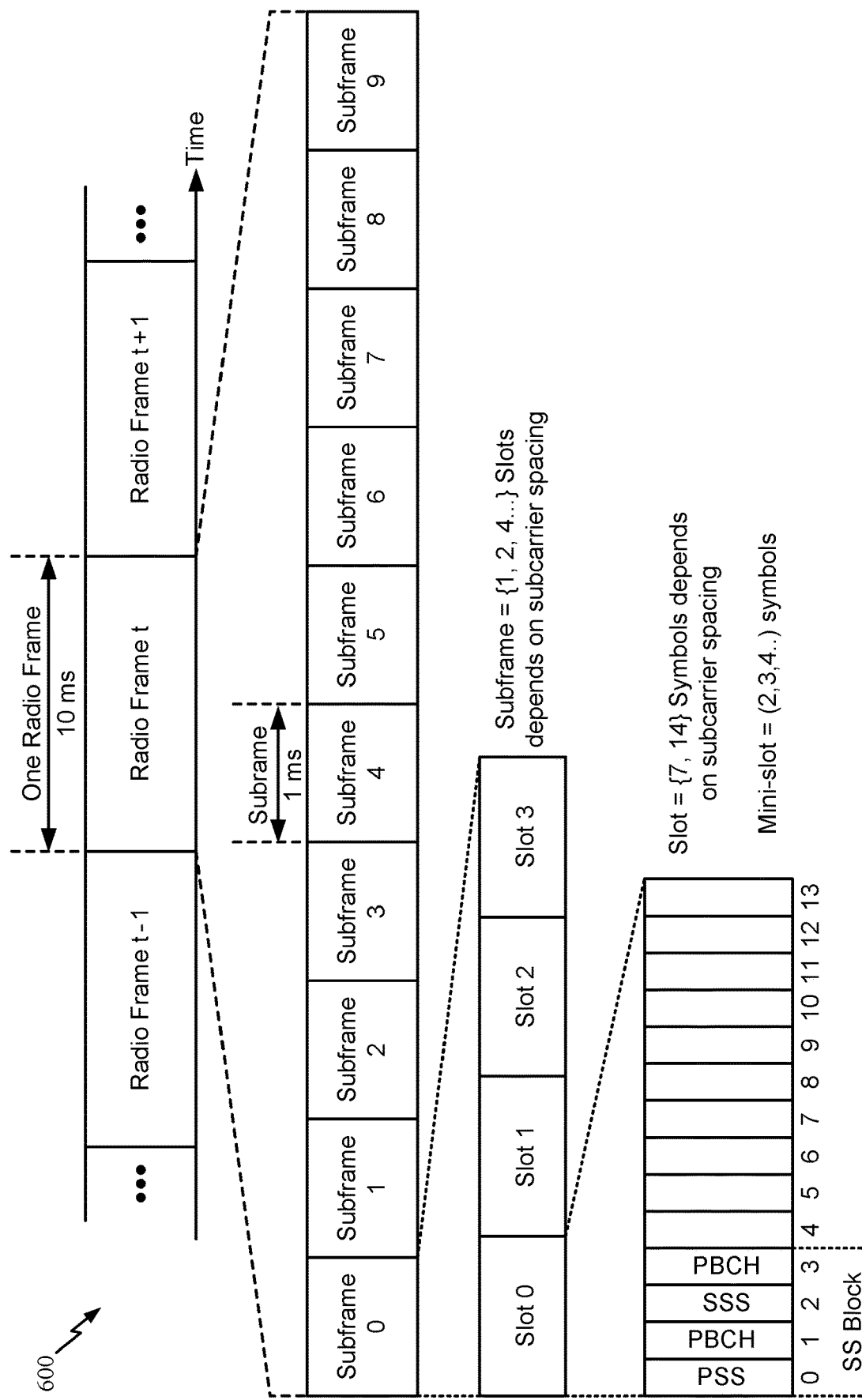
FIG. 6 illustrates an example of a frame format for a new radio (NR) system, in accordance with certain aspects of the present disclosure, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example QCL Signaling

In many cases, it may be important for a user equipment (UE) to know which assumptions it can make on a channel corresponding to different transmissions. For example, the UE may need to know which reference signals (RSs) it can use to estimate the channel in order to decode a transmitted signal (e.g., physical downlink control channel (PDCCH) or physical downlink shared channel (PDSCH)). It may also be important for the UE to be able to report relevant channel state information (CSI) to the BS (gNB) for scheduling, link adaptation, and/or beam management purposes. In new radio (NR), the concept of quasi co-location (QCL) and transmission configuration indicator (TCI) states is used to convey information about these assumptions.

QCL assumptions are generally defined in terms of channel properties. Per $3^{rd}$ Generation Partnership Project (3GPP) TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the downlink (DL) RSs in one CSI-RS set and the PDSCH demodulation reference signal (DMRS) ports.

In some cases, a UE may be configured with up to M TCI-States. Configuration of the M TCI-States can come about via higher layer signalling, while a UE may be signalled to decode PDSCH according to a detected PDCCH with downlink control information (DCI) indicating one of the TCI states. For example, a particular TCI state may be indicated by an N bit DCI field for a PDSCH. Each configured TCI state may include one RS set TCI-RS-SetConfig indicating different QCL assumptions between certain source and target signals.

In certain deployments, techniques are used to provide QCL signaling for RSs and channels across scenarios involving multiple cells, such as coordinated multipoint (CoMP) scenarios in which multiple transmit receive points (TRPs) or integrated access and backhaul (IAB) nodes each have their own cell ID.

FIG. 7 illustrates an example of how RSs associated with TCI states may be configured via radio resource control (RRC) signaling. QCL information and/or types may, in some scenarios, depend on or be a function of other information. For example, the QCL types indicated to the UE may be based on higher layer parameter, QCL-Type, and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial RX parameter}, Spatial QCL assumptions (QCL-TypeD) may be used to help a UE select an analog RX beam (e.g., during beam management procedures). For example, a synchronization signal block (SSB) resource indicator may indicate a same beam for a previous reference signal should be used for a subsequent transmission.

As illustrated in FIG. 7, the TCI states may indicate which RSs are QCL'd and the QCL type. The TCI state may also indicate a ServCellIndex, which is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 8:
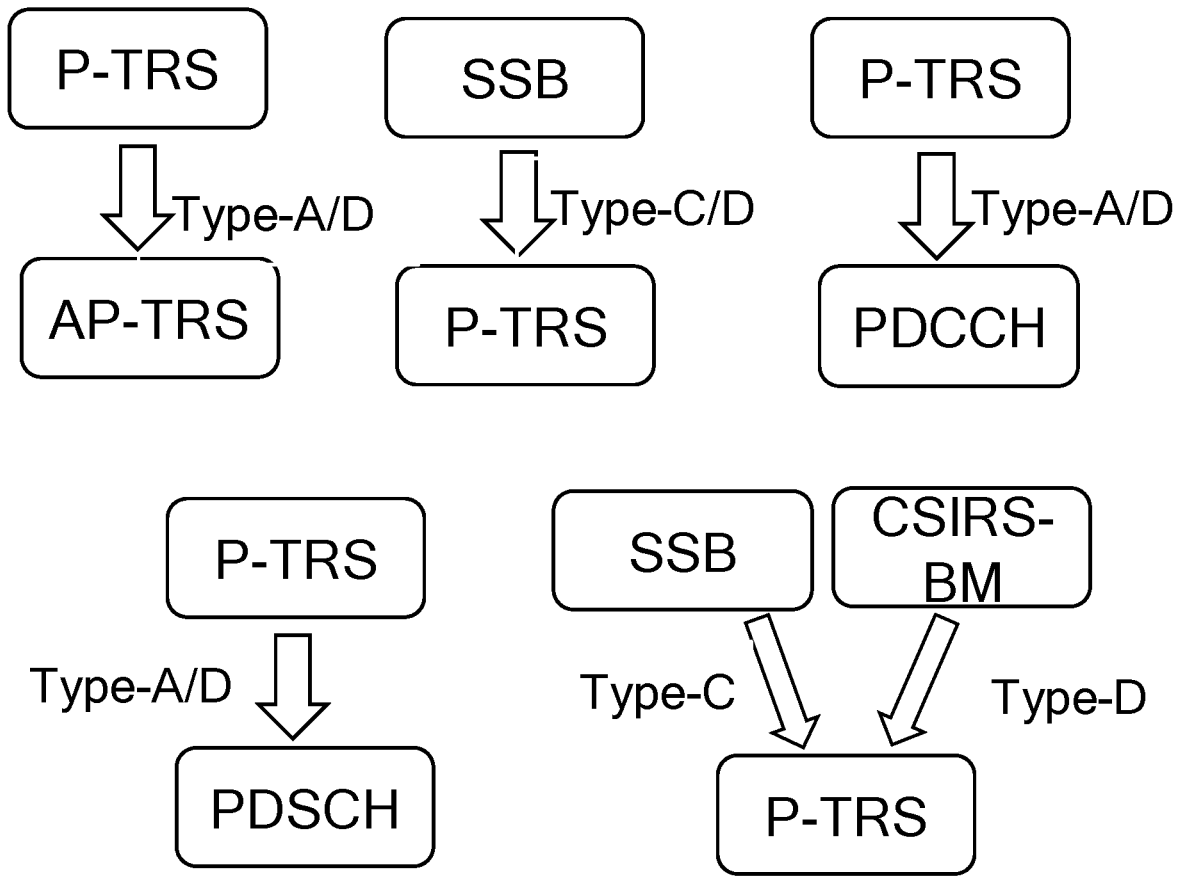
FIG. 8 graphically illustrates example QCL relationships between source and target reference signals, in accordance aspects of the present disclosure.

FIG. 8 illustrates examples of the association of DL reference signals with corresponding QCL types that may be indicated by a TCI-RS-SetConfig, in accordance with aspects of the present disclosure.

In the examples of FIG. 8, a source RS may be indicated in the top block and may be associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use these various channel properties (determined based on the source RS) to process the target signal. A target RS does not necessarily need to be PDSCH's DMRS, rather it may be any other RS, such as a PUSCH DMRS, a CSIRS, a TRS, or a SRS.

As illustrated, each TCI-RS-SetConfig contains parameters. These parameters may, for example, configure QCL relationship(s) between RSs in the RS set and the DMRS port group of the PDSCH. The RS set may contain a reference to either one or two DL RSs and an associated QCL-Type for each one configured by the higher layer parameter QCL-Type.

As illustrated in FIG. 8, for the case of two DL RSs, the QCL types may take on a variety of arrangements. For example, QCL types may not be the same, regardless of whether the references are to the same DL RS or different DL RSs. In the illustrated example, SSB may be associated with Type C QCL for P-TRS, while CSI-RS for beam management (CSIRS-BM) may be associated with Type D QCL.

When a set of TCI-state identifications (IDs) for PDSCH are activated by a media access control (MAC) control element (CE) for a set of component carriers (CCs)/bandwidth parts (BWPs) at least for the same band, where the applicable list of CCs is indicated by RRC signaling, the same set of TCI-state IDs may be applied for the all BWPs in the indicated CCs. In some aspects, inter-band carrier aggregation (CA) may be supported for this feature (i.e., use of a single MAC CE to activate the same set of PDSCH TCI state IDs for multiple CCs/BWPs)

In some aspects, the applicable list of bands for the feature may be indicated and may be based on UE capability. Additionally, this feature may apply to single transmit receive points (TRP) or multi-TRP cases.

Various combinations of CCs may be configured by RRC and relevant UE capability.

For the purpose of simultaneous TCI state activation across multiple CCs/BWPs, a maximum of two lists of CCs may be configured by RRC per UE. The applied list may be determined by the indicated CC in the MAC CE (and apply to all CCs in the list containing the indicated CC). In some aspects, the lists may be restricted such that a UE would not expect overlapped CCs in multiple RRC configured lists of CCs.

Example Simultaneous Power Saving Behavior Update Across Multiple Frequency Resource Sets Certain aspects of the present disclosure provide apparatus, methods, processing systems, and computer readable mediums for applying power saving techniques. More specifically, a common power saving behavior may be applied across multiple frequency resource sets (e.g., component carriers (CCs) and/or bandwidth parts (BWPs)).

For example, for a group CC based beam update, each CC group may share the same analog beamformer, thereby resulting in each CC in the group sharing a same radio frequency (RF) frontend (e.g., generally defined as everything between the antenna and the digital baseband system). Thus, it would be advantageous to have each CC in the group of CCs configured with or otherwise have the same sleep behavior. However, currently, some power saving techniques are applied per CC and/or per BWP (as opposed to application of the power saving behavior across multiple frequency resource sets). Cross-slot scheduling adaptation is one example where power saving techniques are applied per CC/BWP.

One of the main design targets of NR is to support multiple applications, including low-latency data transmissions. To achieve that, multiple features have been introduced, among which includes dynamic scheduling timings (denoted by K0, K1, and K2) which determine the delay between the different paired control and data transmissions. K0 is the offset between the downlink (DL) slot where the physical downlink control channel (PDCCH) (i.e., PDCCH carrying downlink control information (DCI)) for downlink scheduling is received and the DL slot where physical downlink shared channel (PDSCH) data is scheduled. K1 is the offset between the DL slot where the data is scheduled on PDSCH and the UL slot where hybrid automatic repeat request (HARQ) acknowledgement (ACK)/negative acknowledgement (NACK) feedback for the scheduled PDSCH data needs to be sent. K2 is the offset between the DL slot where the PDCCH (i.e., PDCCH carrying DCI) for uplink (UL) scheduling is received and the UL slot where the UL data needs to be sent on PUSCH.

Thus, in one example, two CCs, CC0 and CC1, which share a same RF frontend may have different minimum applicable K0 scheduling delay values. Accordingly, CC0 may have a K0 value of 0 and CC1 may have a K0 value of 2. Because the K0 value is set to 0 for CC0, RF may not turn off.

In the alternative case, K0 values may be restricted. For example, individual DCIs may indicate the minimum K0 value as 2 for all CCs in a group; however, this restriction may reduce efficiency and reliability.

To adopt a minimum applicable value of scheduling delays, K0 (or K2), for an active DL (or UL) BWP for the carrier where PDSCH (or physical uplink shared channel (PUSCH)) is transmitted, various features may be supported. In some aspects, there may be one or two radio resource control (RRC) configured values for restriction to the active TDRA table and each RRC configuration may be per BWP. In some examples where there are one or two RRC configured values for a BWP, a 1-bit indication may be used to indicate one RRC configured value from the two candidate values. In some examples where there is only one RRC configured value, the 1-bit indication may further indicate whether or not there is a restriction (or no restriction) to the active TDRA table.

In some aspects, the 1-bit indication in DCI format 1_1 or format 0_1 may be used to jointly determine the minimum applicable K0 for the active DL BWP and the minimum applicable K2 value for the active UL BWP, which are to be applied at least after the application delay.

Aspects of the present disclosure, however, may enhance power saving and simplify signaling (with reduced overhead), by allowing a common power saving behavior to be applied across multiple frequency resource sets (i.e., application across multiple CCs and/or BWPs).

Figure 9:
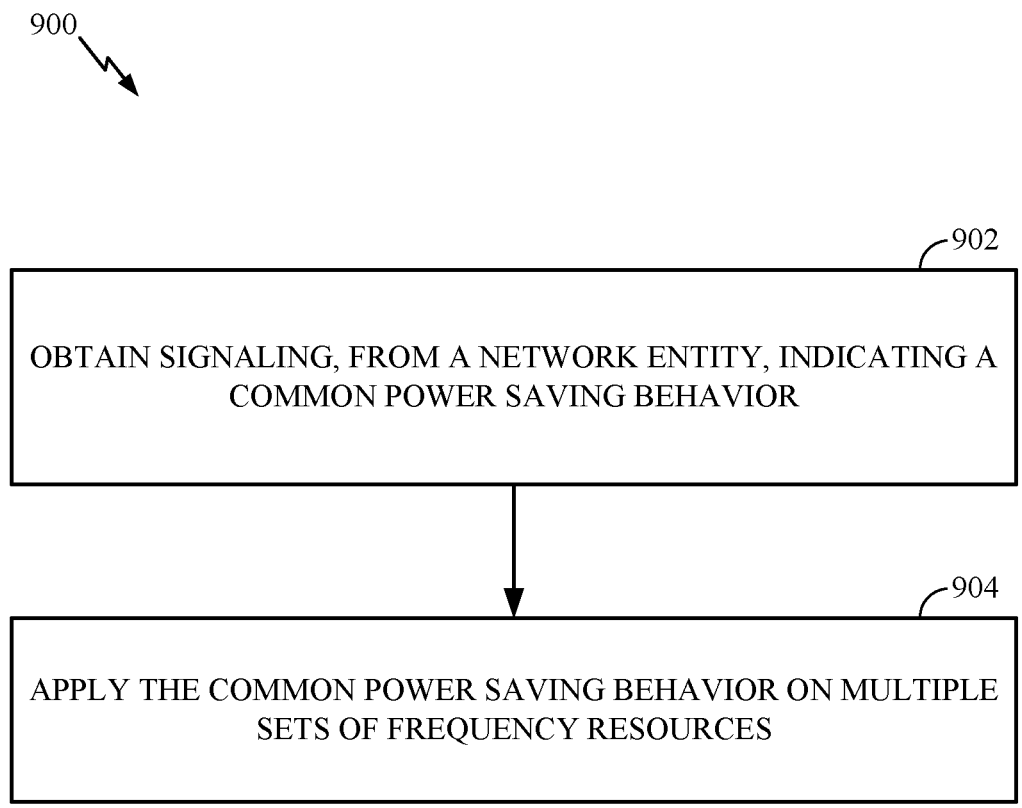
FIG. 9 illustrates example operations for wireless communications by a UE, in accordance with aspects of the present disclosure.

FIG. 9 is a flow diagram illustrating example operations 900 for wireless communication, in accordance with certain aspects of the present disclosure. The operations 900 may be performed, for example, by a UE (e.g., such as UE 120 in the wireless communication network 100). For example, a UE 120 of FIG. 1 may perform operations 900 to enhance power saving. The operations 900 may be complementary operations by the UE to the operations 1000 performed by the network entity (e.g., such as BS 110 in the wireless communication network 100). Operations 900 may be implemented as software components that are executed and run on one or more processors (e.g., processor 480 of FIG. 4). Further, the transmission and reception of signals by the UE in operations 900 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

The operations 900 may begin, at block 902, by the UE obtaining signaling, from a network entity, indicating a common power saving behavior. At block 904, the UE applies the common power saving behavior on multiple sets of frequency resources.

Figure 10:
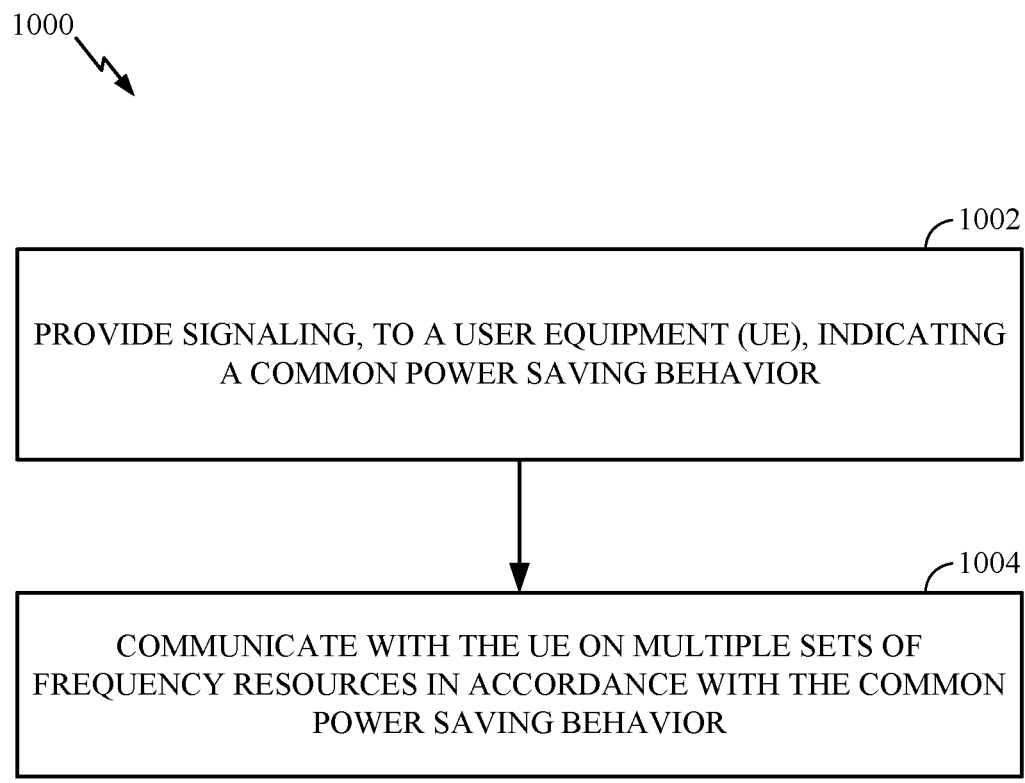
FIG. 10 illustrates example operations for wireless communications by a network entity, in accordance with aspects of the present disclosure.

FIG. 10 is a flow diagram illustrating example operations 1000 for wireless communication, in accordance with certain aspects of the present disclosure. The operations 10000 may be performed, for example, by a network entity (e.g., such as BS 110 in the wireless communication network 1000. The operations 1000 may be complementary operations by the network entity to the operations 900 performed by the UE (e.g., such as UE 120 in the wireless communication network 100). Operations 1000 may be implemented as software components that are executed and run on one or more processors (e.g., processor 440 of FIG. 4). Further, the transmission and reception of signals by the network entity in operations 1000 may be enabled, for example, by one or more antennas (e.g., antennas 434 of FIG. 4). In certain aspects, the transmission and/or reception of signals by the source node may be implemented via a bus interface of one or more processors (e.g., processor 440) obtaining and/or outputting signals.

The operations 1000 may begin, at block 1002, by a network entity providing signaling, to a UE, indicating a common power saving behavior. At block 1004, the network entity communicates with the UE on multiple sets of frequency resources in accordance with the common power saving behavior.

In this manner, a common power saving behavior may be simultaneously updated on multiple BWPs/CCs. Overhead may be reduced by providing this update to multiple BWPs/CCs via a single indication for updating power saving behavior across multiple BWPs/CCs.

As used herein, the term common power saving behavior may include any number of various power savings features applied across multiple frequency resource sets (e.g., CCs and/or BWPs).

In some aspects, applying the common power saving behavior may include applying a common wakeup/sleep time pattern across multiple frequency resource sets. In normal operation, a UE may be awake at all times to monitor PDCCH for every subframe; however, this may cause power consumption issues at the UE side. For example, if the UE is awake when no data is being transmitted from the network entity, the UE may be wasting energy. Thus, a discontinuous reception (DRX) mechanism is introduced which allows a UE to enter sleep mode for a certain period of time and wake up for a subsequent period of time. Accordingly, a common wakeup/sleep time pattern may be a common DRX ON/OFF pattern applied across all CCs and/or BWPs.

In some aspects, signaling indicating the common power saving behavior may include a common time pattern for PDCCH monitoring, and corresponding search space/CORESET configurations. Accordingly, the PDCCH monitoring time pattern, and corresponding search space/CORESET configurations, may be applied across the multiple frequency resource sets In some examples, a joint (common) monitoring pattern across multiple CCs may be explicitly indicating a common monitoring time pattern across multiple CCs.

In some aspects, frequency resource sets may have different numerologies. Numerology corresponds to one subcarrier spacing (SCS) in the frequency domain. In order to support the wide range of deployment scenarios, from large cells with sub-1 GHz carrier frequency up to mm-wave deployments with very wide spectrum allocations, NR supports a flexible numerology with a range of SCS, based on scaling a baseline SCS of 15 kHz. By scaling a reference subcarrier spacing by an integer N, different numerologies may be defined. Accordingly, in aspects where frequency resources (e.g., CCs/BWPs) have different numerologies, the common monitoring time pattern may have a same start time with different/same monitoring occasion durations across the multiple frequency resource sets. In some examples, at least one of the monitoring occasion start times or monitoring occasion durations may be indicated based on a number of symbols in a reference numerology. Orthogonal frequency division multiplexing (OFDM) symbols may specify the first symbol of each control resource set (CORESET) monitoring opportunity in a slot. For example, a common monitoring tune pattern may start every X slots for a reference numerology (e.g., SCS=30 KHz). Further, the monitoring occasion may be relative to the SCS (e.g., a monitoring occasion duration with 2 symbols per SCS) or absolute (e.g., a monitoring occasion duration equal to 2 symbols for a reference SCS). To ensure monitoring of PDCCH transmissions is common to all CCs, the relative or absolute monitoring occasion duration may be indicated based on the symbols in the reference numerology.

In some aspects, the common power savings behavior may include/involve a common dormancy or non-dormancy state. Accordingly, the common dormancy or non-dormancy state may be applied across the multiple frequency resource sets. For example, while in a common dormancy state, PDCCH monitoring may be OFF on an activated cell (i.e., the UE may not monitor for PDCCH transmission on the multiple sets of frequency resources).

In some aspects, the common power saving behavior may include/involve a common restriction on one or more spatial parameters. Accordingly, the common restriction on one or more spatial parameters may be applied across the multiple frequency resource sets. In some examples, the restriction may involve a common maximum number of DL/UL multiple-input multiple-output (MIMO) layers. In some examples, the restriction may involve a common maximum number of DL/UL active beams (e.g., indicated via active transmission configuration indicator (TCI) states/spatial relations).

In some aspects, the common power saving behavior may include/involve a common minimum scheduling offset between DCI and scheduled DL/UL signals. Accordingly, the common minimum scheduling offset may be applied across the multiple frequency resource sets. For example, the common minimum scheduling may involve a minimum K0 or K2 value for PDSCH, access point (AP) channel state information reference signal (CSI-RS), PUSCH, or AP sounding reference signal (SRS). In some examples where CCs have different numerologies, a common minimum K0 or K2 value may be signaled via common absolute values (e.g., K0 or K2 value for a reference numerology like SCS=30 KHz), and the value for the reference numerology may be converted to corresponding K0 or K2 values for the different numerologies. As an alternative, in some examples where CCs have different numerologies, different minimum K0 or K2 values may be signaled for different numerologies (e.g., different K0 or K2 values in the different numerologies chosen such that they would result in the same absolute scheduling delay).

Figure 11:
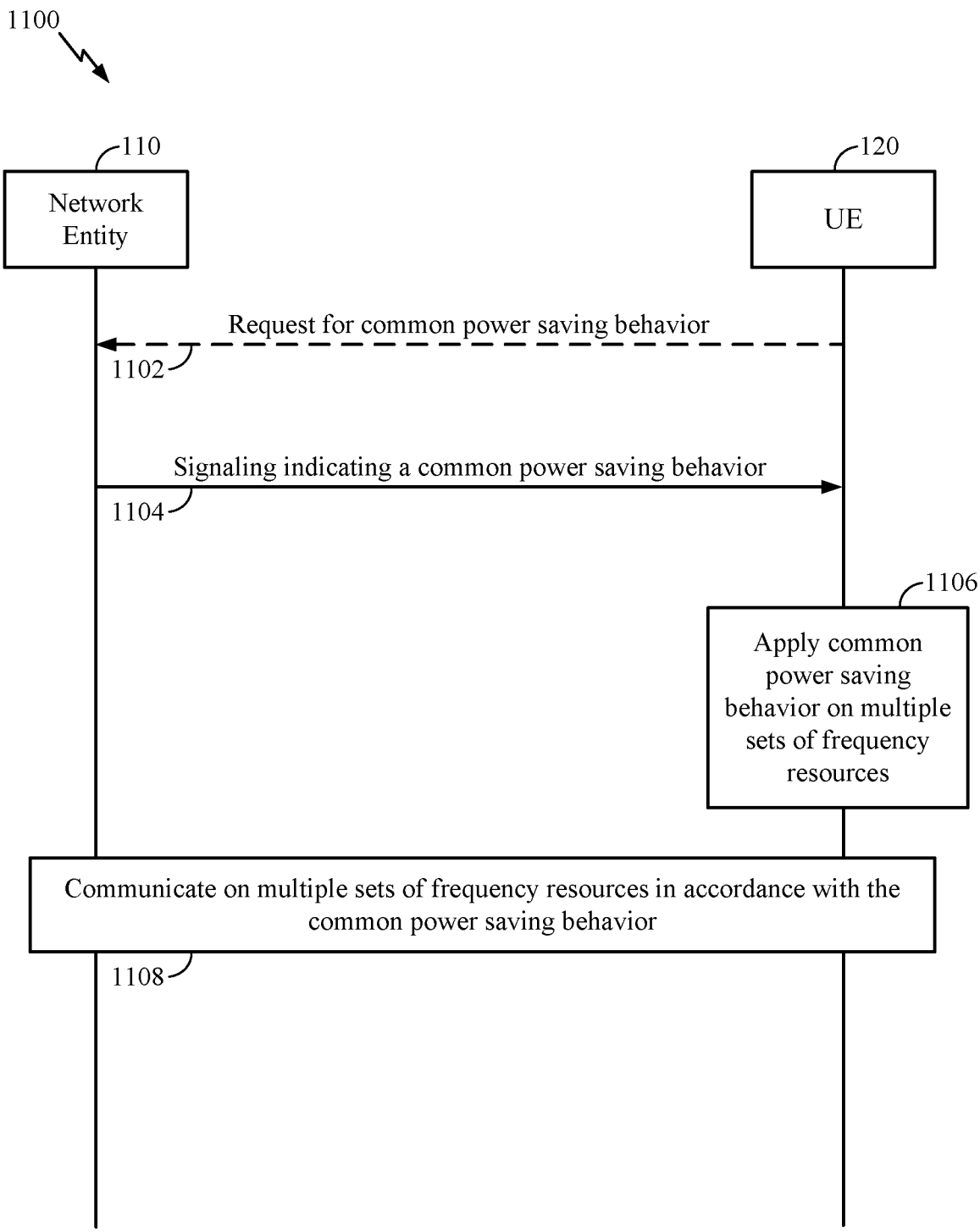
FIG. 11 is a call flow diagram illustrating example signaling for simultaneously updating power saving behavior across multiple frequency resource sets, in accordance with certain aspects of the present disclosure.

FIG. 11 is a call flow diagram illustrating example signaling for simultaneously updating power saving behavior across multiple frequency resource sets, in accordance with certain aspects of the present disclosure. As shown in FIG. 11, at 1104, a UE 120 may obtaining signaling, from a network entity 110, indicating a common power saving behavior. In some examples, the signaling may be via RRC signaling. In some examples, the signaling may be via a media access control (MAC) control element (CE). In some examples, the signaling may be via DCI.

In some aspects, the network entity 110 may provide signaling, to the UE 120, in response to received request from the UE 120. Accordingly, at 1102, UE 120 may send network entity 110 a request for common power saving behavior (e.g. in uplink control information (UCI) or MAC-CE). Accordingly, the network entity 110 may send signaling, at 1104, to the UE 120 in response to the received request.

At 1106, the UE 120 may apply the common power saving behavior on multiple sets of frequency resources. In some examples, the frequency resource sets (e.g., BWPs/CCs), on which the common power saving behavior is to be applied, may be indicated via RRC signaling, a MAC-CE, or DCI. The signaling may be the same signaling or different signaling from that for indicating the common power saving behavior.

For example, as noted above, multiple lists of CCs may be configured by RRC per UE, and an indicated CC in the MAC-CE or DCI may determine which list to apply the common power saving behavior to. Additionally, the indicated CC may also signal the common power saving behavior. In other words, the common power saving behavior may be applied to all CCs in the list including the indicated CC in the MAC-CE or DCI.

In some aspects, multiple lists of CCs used for CC-based beam updates may be re-used for common power saving behavior updates.

In some aspects, simultaneously updating power saving behavior across multiple sets of frequency resources (e.g., BWPs/CCs) may be enabled by explicit signalling. In some aspects, simultaneously updating power saving behavior across multiple sets of frequency resources may be enabled based on whether any CC list is configured.

After the power saving behavior has been simultaneously updated across multiple sets of frequency resources, at 1108, the network entity 110 and UE 120 may communicate on multiple sets of frequency resources in accordance with the common power saving behavior.

Figure 12:
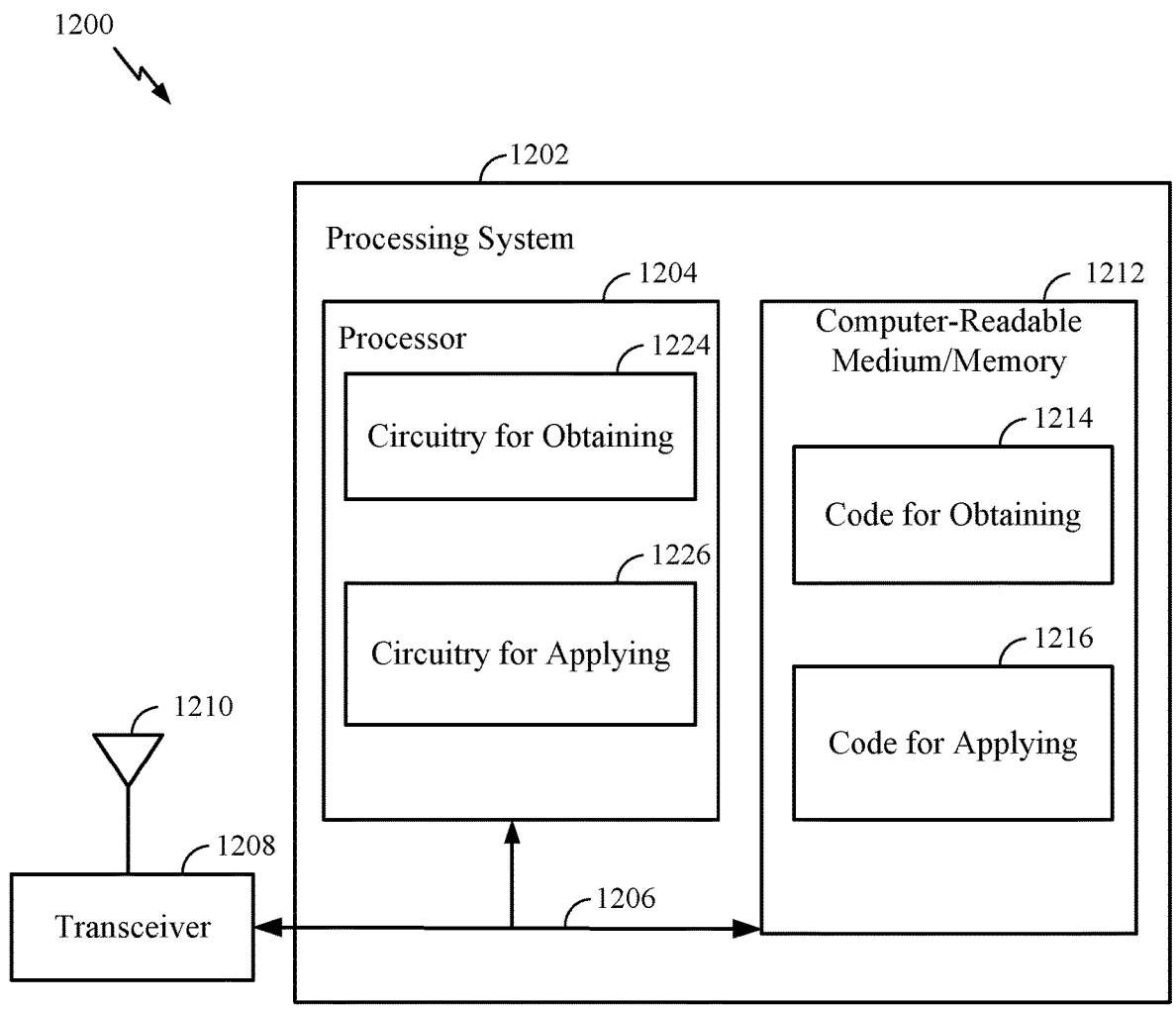
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein for simultaneously updating power saving behavior on multiple sets of frequency resources (e.g., CCs/BWPs). In certain aspects, computer-readable medium/memory 1212 stores code 1214 for obtaining (e.g., for obtaining signaling, from a network entity, indicating a common power saving behavior) and code 1216 for applying (e.g., applying the common power saving behavior on multiple sets of frequency resources). In certain aspects, the processor 1204 has circuitry configured to implement the code stored in the computer-readable medium/memory 1212. The processor 1204 includes circuitry 1224 for obtaining (e.g., for obtaining signaling, from a network entity, indicating a common power saving behavior) and circuitry for applying (e.g., applying the common power saving behavior on multiple sets of frequency resources).

Figure 13:
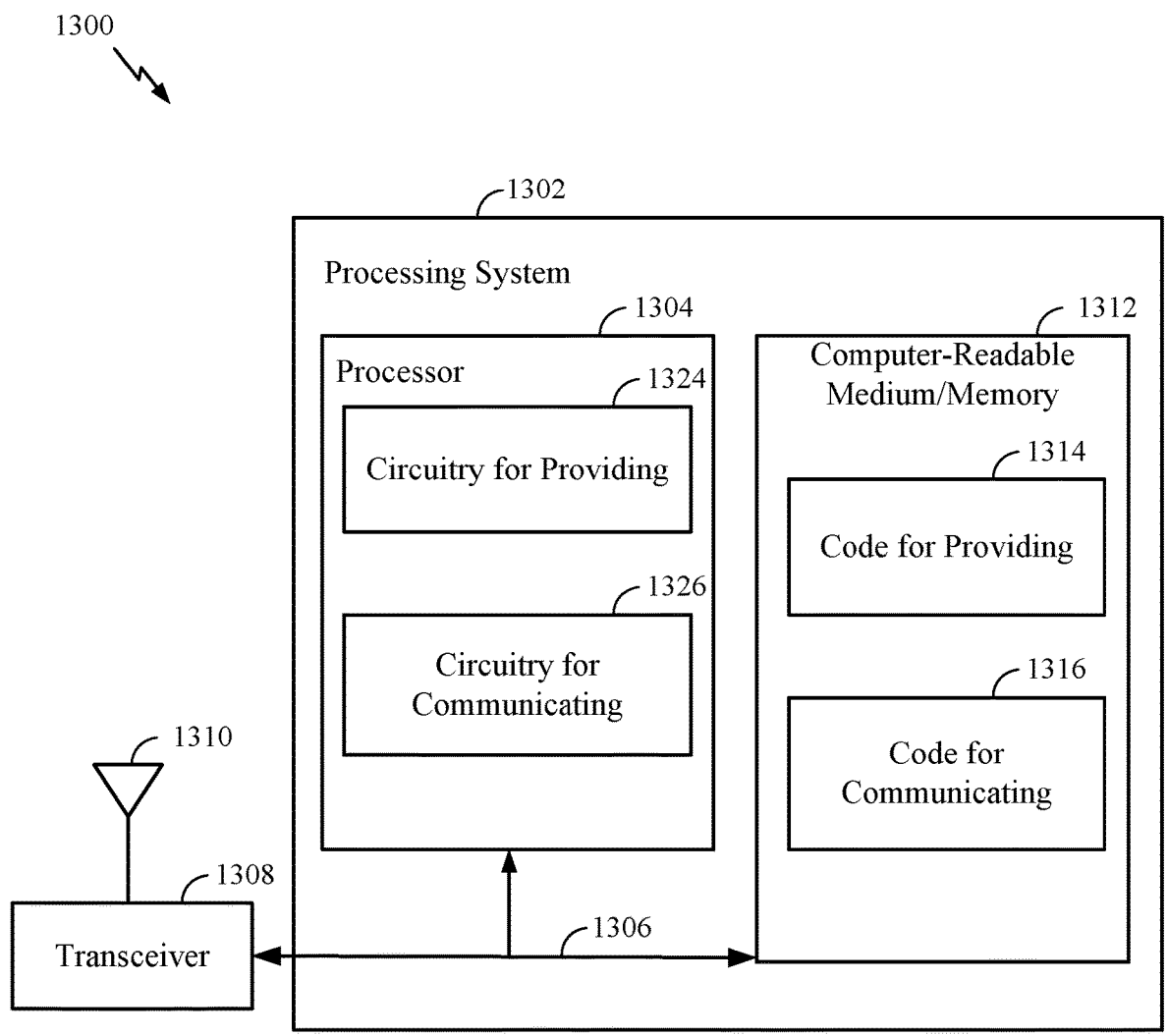
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308. The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 10, or other operations for performing the various techniques discussed herein for simultaneously updating power saving behavior on multiple sets of frequency resources (e.g., CCs/BWPs). In certain aspects, computer-readable medium/memory 1312 stores code 1314 for providing (e.g., for providing signaling, to a UE, indicating a common power saving behavior) and code 1316 for communicating (e.g., for communicating with the UE on multiple sets of frequency resources in accordance with the common power saving behavior). In certain aspects, the processor 1304 has circuitry configured to implement the code stored in the computer-readable medium/memory 1312. The processor 1304 includes circuitry 1324 for providing (e.g., for providing signaling, to a UE, indicating a common power saving behavior) and circuitry 1326 for communicating (e.g., for communicating with the UE on multiple sets of frequency resources in accordance with the common power saving behavior).

Example Aspects

Aspect 1. A method for wireless communications by a user equipment (UE), comprising obtaining signaling, from a network entity, indicating a common power saving behavior, and applying the common power saving behavior on multiple sets of frequency resources.

Aspect 2. The method of Aspect 1, wherein the multiple sets of frequency resources comprise at least one of multiple component carriers or multiple bandwidth parts (BWPs).

Aspect 3. The method of Aspect 1 or 2, wherein applying the common power saving behavior comprises applying common dormancy or non-dormancy states across the multiple sets of frequency resources.

Aspect 4. The method of Aspect 3, wherein the UE does not monitor for physical downlink control channel (PDCCH) transmissions on the multiple sets of frequency resources during a common dormancy state.

Aspect 5. The method of any of Aspects 1-4, wherein applying the common power saving behavior comprises applying a common restriction on one or more spatial parameters across the multiple sets of frequency resources.

Aspect 6. The method of Aspect 5, wherein the restriction on one or more spatial parameters comprises a maximum number of active downlink beams or uplink beams.

Aspect 7. The method of Aspect 5 or 6, wherein the restriction on one or more spatial parameters comprises a maximum number of downlink multiple input multiple output (MIMO) layers or uplink MIMO layers.

Aspect 8. The method of any of Aspects 1-7, wherein applying the common power saving behavior comprises monitoring a common time pattern for physical downlink control channel (PDCCH) transmissions across the multiple sets of frequency resources.

Aspect 9. The method of Aspect 8, wherein the signaling indicates the common time pattern.

Aspect 10. The method of Aspect 8 or 9, wherein, for frequency resources with different numerologies, the common monitoring time pattern has a same start time with a same or different monitoring occasion durations across different frequency resources.

Aspect 11. The method of Aspect 10, wherein at least one of monitoring occasion start times or monitoring occasion durations are indicated based on a number of symbols in a reference numerology.

Aspect 12. The method of any of Aspects 1-11, further comprising determining the multiple sets of frequency resources on which to apply the common power saving behavior, based on the signaling.

Aspect 13. The method of Aspect 12, wherein the determination is based on a frequency resource in which the signaling is received.

Aspect 14. The method of Aspect 12 or 13, wherein the determination is based on at least one of explicit signaling or whether a list of component carriers (CCs) is configured.

Aspect 15. A method for wireless communications by a network entity, comprising providing signaling, to a user equipment (UE), indicating a common power saving behavior and communicating with the UE on multiple sets of frequency resources in accordance with the common power saving behavior.

Aspect 16. The method of Aspect 15, wherein the multiple sets of frequency resources comprise at least one of multiple component carriers or multiple bandwidth parts (BWPs).

Aspect 17. The method of Aspect 15 or 16, wherein the common power saving behavior comprises applying common dormancy or non-dormancy states across the multiple sets of frequency resources.

Aspect 18. The method of Aspect 17, wherein the UE does not monitor for physical downlink control channel (PDCCH) transmissions on the multiple sets of frequency resources during a common dormancy state.

Aspect 19. The method of any of Aspects 15-18, wherein the common power saving behavior comprises applying a common restriction on one or more spatial parameters across the multiple sets of frequency resources.

Aspect 20. The method of Aspect 19, wherein the restriction on one or more spatial parameters comprises a maximum number of active downlink beams or uplink beams.

Aspect 21. The method of Aspect 19 or 20, wherein the restriction on one or more spatial parameters comprises a maximum number of downlink multiple input multiple output (MIMO) layers or uplink MIMO layers.

Aspect 22. The method of any of Aspects 15-21, wherein the common power saving behavior comprises monitoring a common time pattern for physical downlink control channel (PDCCH) transmissions across the multiple sets of frequency resources.

Aspect 23. The method of Aspect 22, wherein the signaling indicates the common time pattern.

Aspect 24. The method of Aspect 22 or 23, wherein, for frequency resources with different numerologies, the common monitoring time pattern has a same start time with a same or different monitoring occasion durations across different frequency resources.

Aspect 25. The method of Aspect 24, wherein at least one of monitoring occasion start times or monitoring occasion durations are indicated based on a number of symbols in a reference numerology.

Aspect 26. The method of any of Aspects 15-25, further comprising indicating the multiple sets of frequency resources on which to apply the common power saving behavior, via the signaling.

Aspect 27. The method of Aspect 26, wherein the indication is based on a frequency resource in which the signaling is received.

Aspect 28. The method of Aspect 26 or 27, wherein the indication is based on at least one of explicit signaling or whether a list of component carriers (CCs) is configured.

Aspect 29. An apparatus for wireless communication by a user equipment (UE), comprising a memory and at least one processor coupled to the memory, the at least one processor being configured to obtain signaling, from a network entity, indicating a common power saving behavior and apply the common power saving behavior on multiple sets of frequency resources.

Aspect 30. An apparatus for wireless communication by a network entity, comprising a memory and at least one processor coupled to the memory, the at least one processor being configured to provide signaling, to a user equipment (UE), indicating a common power saving behavior and communicate with the UE on multiple sets of frequency resources in accordance with the common power saving behavior.

Additional Considerations

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, operations 900 and 1000 of FIGS. 9 and 10 may be performed by various processors shown in FIG. 4. Generally, where there are operations illustrated in figures, those operations may have corresponding counterpart means-plus-function.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). The phrase computer readable medium does not refer to a transitory propagating signal. In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications at a user equipment (UE), comprising:
one or more processors, individually or collectively, configured to execute instructions stored on one or more memories and to cause the UE to:
obtain signaling, from a network entity, including an indication of one or more power saving behaviors for monitoring for physical downlink control channel (PDCCH) transmissions across multiple sets of frequency resources, wherein the indication of the one or more power saving behaviors comprises an indication of:
a discontinuous reception (DRX) pattern for monitoring for the PDCCH transmissions across the multiple sets of frequency resources; and
a dormancy state or non-dormancy state associated with a cell for the PDCCH transmissions across the multiple sets of frequency resources; and
monitor for the PDCCH transmissions based on the one or more power saving behaviors.

2. The apparatus of claim 1, wherein the dormancy state indicates that the monitoring for the PDCCH transmissions is OFF for the cell.

3. The apparatus of claim 2, wherein, in order to monitor for the PDCCH transmissions based on the one or more power saving behaviors, the one or more processors are configured to cause the UE to not monitor for the PDCCH transmissions on the multiple sets of frequency resources during the dormancy state.

4. The apparatus of claim 1, wherein the multiple sets of frequency resources comprise multiple bandwidth parts (BWPs).

5. The apparatus of claim 1, wherein:
the indication of the one or more power saving behaviors further comprises an indication of a restriction on one or more spatial parameters across multiple sets of frequency resources; and
the restriction on the one or more spatial parameters comprises a maximum number of active downlink beams or uplink beams.

6. The apparatus of claim 1, wherein:
the indication of the one or more power saving behaviors further comprises an indication of a restriction on one or more spatial parameters across multiple sets of frequency resources; and
the restriction on one or more spatial parameters comprises a maximum number of downlink multiple input multiple output (MIMO) layers or uplink MIMO layers.

7. The apparatus of claim 1, wherein:
the indication of the one or more power saving behaviors further comprises an indication of:
a monitoring time pattern for monitoring for the PDCCH transmissions across the multiple sets of frequency resources; and
a start time for the monitoring time pattern; and
for frequency resources with different numerologies:
the start time for the monitoring time pattern comprises a same start time across the multiple sets of frequency resources; and
the monitoring time pattern has a same or different monitoring occasion durations across the multiple sets of frequency resources.

8. The apparatus of claim 7, wherein at least one of the same start time or monitoring occasion durations are indicated based on a number of symbols in a reference numerology.

9. The apparatus of claim 1, wherein the one or more processors are further configured to cause the UE to determine the multiple sets of frequency resources on which to apply the one or more power saving behaviors, based on the signaling.

10. The apparatus of claim 9, wherein the one or more processors are configured to cause the UE to determine the multiple sets of frequency resources based on a frequency resource in which the signaling is received.

11. The apparatus of claim 9, wherein the one or more processors are configured to cause the UE to determine the multiple sets of frequency resources based on at least one of explicit signaling or whether a list of component carriers (CCs) is configured.

12. An apparatus for wireless communications at a network entity, comprising:
one or more processors, individually or collectively, configured to execute instructions stored on one or more memories and to cause the network entity to:
provide, to a user equipment (UE), signaling including an indication of one or more power saving behaviors for monitoring for physical downlink control channel (PDCCH) transmissions across multiple sets of frequency resources, wherein the indication of the one or more power saving behaviors comprises an indication of:
a discontinuous reception (DRX) pattern for monitoring for the PDCCH transmissions across the multiple sets of frequency resources; and
a dormancy state or non-dormancy state associated with a cell for the PDCCH transmissions across the multiple sets of frequency resources; and communicate with the UE on the multiple sets of frequency resources in accordance with the one or more power saving behaviors.

13. The apparatus of claim 12, wherein the dormancy state indicates that the monitoring for the PDCCH transmissions is OFF for the cell.

14. The apparatus of claim 13, wherein the one or more power saving behaviors configure the UE to not monitor for the PDCCH transmissions on the multiple sets of frequency resources during the dormancy state.

15. The apparatus of claim 12, wherein the multiple sets of frequency resources comprise multiple bandwidth parts (BWPs).

16. The apparatus of claim 12, wherein:
the indication of the one or more power saving behaviors further comprises an indication of a restriction on one or more spatial parameters across multiple sets of frequency resources; and
the restriction on the one or more spatial parameters comprises a maximum number of active downlink beams or uplink beams.

17. The apparatus of claim 12, wherein:
the indication of the one or more power saving behaviors further comprises an indication of a restriction on one or more spatial parameters across multiple sets of frequency resources; and
the restriction on one or more spatial parameters comprises a maximum number of downlink multiple input multiple output (MIMO) layers or uplink MIMO layers.

18. The apparatus of claim 12, wherein:
the indication of the one or more power saving behaviors further comprises an indication of:
a monitoring time pattern for monitoring for the PDCCH transmissions across the multiple sets of frequency resources; and
a start time for the monitoring time pattern; and
for frequency resources with different numerologies:
the start time for the monitoring time pattern comprises a same start time across the multiple sets of frequency resources; and
the monitoring time pattern has a same or different monitoring occasion durations across the multiple sets of frequency resources.

19. The apparatus of claim 18, wherein at least one of the same start time or monitoring occasion durations are indicated based on a number of symbols in a reference numerology.

20. The apparatus of claim 12, wherein the signaling indicates the multiple sets of frequency resources on which to apply the one or more power saving behaviors.

21. The apparatus of claim 20, wherein the indication of the multiple sets of frequency resources on which to apply the one or more power saving behaviors is based on a frequency resource in which the signaling is transmitted.

22. The apparatus of claim 20, wherein the indication is based on at least one of explicit signaling or whether a list of component carriers (CCs) is configured.

23. A method for wireless communications at a user equipment (UE), comprising:
obtaining signaling, from a network entity, including an indication of one or more power saving behaviors for monitoring for physical downlink control channel (PDCCH) transmissions across multiple sets of frequency resources, wherein the indication of the one or more power saving behaviors comprises an indication of:
a discontinuous reception (DRX) pattern for monitoring for the PDCCH transmissions across the multiple sets of frequency resources; and
a dormancy state or non-dormancy state associated with a cell for the PDCCH transmissions across the multiple sets of frequency resources; and
monitoring for the PDCCH transmissions based on the one or more power saving behaviors.

24. The method of claim 23, wherein the dormancy state indicates that the monitoring for the PDCCH transmissions is OFF for the cell.

25. The method of claim 24, wherein monitoring for the PDCCH transmissions based on the one or more power saving behaviors comprises not monitoring for the PDCCH transmissions on the multiple sets of frequency resources during the dormancy state.

26. The method of claim 23, wherein the multiple sets of frequency resources comprise multiple bandwidth parts (BWPs).

27. A method for wireless communications at a network entity, comprising:
providing, to a user equipment (UE), signaling including an indication of one or more power saving behaviors for monitoring for physical downlink control channel (PDCCH) transmissions across multiple sets of frequency resources, wherein the indication of the one or more power saving behaviors comprises an indication of:
a discontinuous reception (DRX) pattern for monitoring for the PDCCH transmissions across the multiple sets of frequency resources; and
a dormancy state or non-dormancy state associated with a cell for the PDCCH transmissions across the multiple sets of frequency resources; and
communicating with the UE on the multiple sets of frequency resources in accordance with the one or more power saving behaviors.

28. The method of claim 27, wherein the dormancy state indicates that the monitoring for the PDCCH transmissions is OFF for the cell.

29. The method of claim 28, wherein the one or more power saving behaviors configure the UE to not monitor for the PDCCH transmissions on the multiple sets of frequency resources during the dormancy state.

30. The method of claim 27, wherein the multiple sets of frequency resources comprise multiple bandwidth parts (BWPs).

* * * * *